Figure 1:
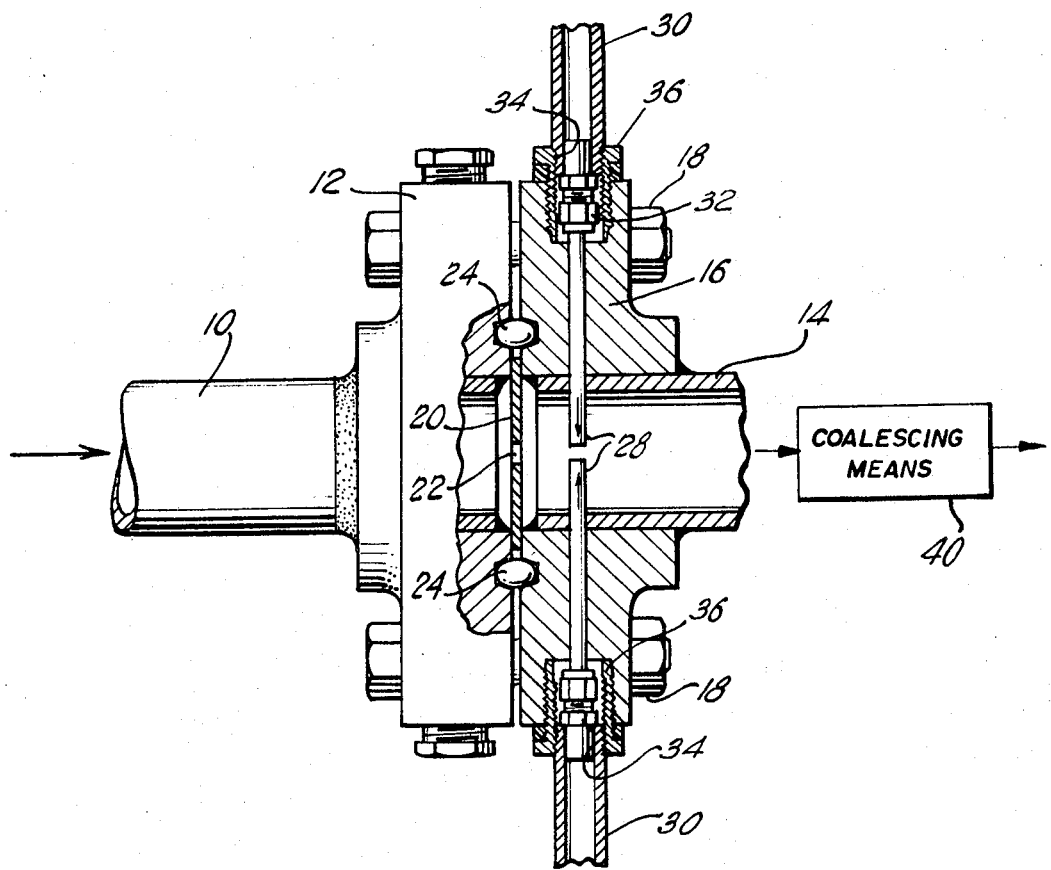

United States Patent [19]

Slater et al.

[11] 3,749,377
[45] July 31, 1973

[54] ORIFICE SCRUBBER FOR REMOVING SOLID PARTICLES FROM HIGH PRESSURE GAS

[75] Inventors: William L. Slater, La Habra, Calif.; Odes B. Robertson, Groves, Tex.

[73] Assignee: Texaco Inc., New York, N.Y.

[22] Filed: Aug. 6, 1968

[21] Appl. No.: 750,592

[52] U.S. Cl......... 261/78 R, 261/DIG. 54, 261/118, 55/257, 239/428, 239/434
[51] Int. Cl................................. B01f 3/04
[58] Field of Search........... 261/76, 78, 78.1, 261/118; 239/428, 433, 434; 55/84, 85, 94, 220, 226, 257

[56] References Cited
UNITED STATES PATENTS

| | | | |
|---|---|---|---|
| 504,723 | 9/1893 | Gray | 261/78 |
| 1,715,205 | 5/1929 | Mantsion | 239/428 |
| 2,768,705 | 10/1956 | Isserlis | 55/220 |
| 2,966,312 | 12/1960 | Wilson, Jr. et al. | 261/78.1 X |
| 3,207,492 | 9/1965 | Zikesch | 261/118 X |
| 2,604,185 | 7/1952 | Johnstone et al. | 55/89 |

Primary Examiner—Tim R. Miles
Assistant Examiner—Steven H. Markowitz
Attorney—K. E. Kavanagh, Thomas H. Whaley and L. H. Phelps, Jr.

[57] ABSTRACT

Scrubbing a gas by injecting a wash liquid directly into a high speed jet stream formed by passing said gas thru a restricted plate orifice at a substantial pressure, atomizing the wash liquid in the jet stream and thereafter coalescing the water droplets containing contaminant materials.

3 Claims, 2 Drawing Figures

PATENTED JUL 31 1973 3,749,377

ORIFICE SCRUBBER FOR REMOVING SOLID PARTICLES FROM HIGH PRESSURE GAS

The present invention relates to the scrubbing of high pressure gas streams to remove entrained or suspended matter and more specifically is concerned with effecting contact between the gas stream and a suitable washing liquid such as water under conditions such that the contaminating matter is absorbed by the water.

In order to obviate the cost of constructing and operating expensive scrubbing towers it has been proposed to effect such contact in a venturi throat where a high speed flow of gas impinges an incoming spray of scrubbing liquid such as water. The mix passes thru the diffusion section of the venturi into a relatively quiescent knock-out or separation drum where the atomized liquid particles coalesce with the contained dust or other contaminants.

It has now been found that removal of suspended matter such as soot, dust, smoke or even fumes and fogs of liquid particles, from high pressure gases can be effected just as efficaceously by discharging a jet stream of gas at a high velocity, for example, of the order of 100 feet per second or above thru a simple orifice plate, and causing the jet to impinge the scrubbing liquid. This is accomplished by providing for the injection of the washing liquid into the jet stream of gas downstream of the orifice and preferably at or ahead of the vena contracta. In other words, the gas jet issues at high speed, from the orifice plate into the open region of the conduit, and since the conduit is of considerably greater lateral dimension than the orifice, and accordingly the jet, the stream or streams of wash liquid are brought into and discharged into the jet stream gas at a point downstream, where it has a transverse dimension materially smaller than that of the orifice. The present invention locates the spray means substantially closer to the axis of the stream than the margins of the orifice, and accordingly directs the wash liquid directly into the jet stream of gas, with the result that absorption of contaminant particles materially increases.

Also, as above indicated, the wash liquid is injected preferably in advance of the vena contracta and in any event not materially downstream thereof.

Moreover the wash liquid is preferably injected in a direction and at a velocity which is substantially zero in the axial direction of the flow of gas. The high velocity gas accordingly tears the liquid into fine streams or ligaments which instantaneously collapse into minute droplets. These in turn are accelerated to the speed of the gas stream. During this time the gas flow is sweeping the multiplicity of fine droplets of wash liquid which, for an appreciable period, have a relative velocity vector in the axial direction of movement of the gas which is different than that of the gas. Accordingly, during the period that they are being brought to the velocity of gas flow they are obviously impacted or traversed by the flow of gas.

This results in a considerable economy of operation inasmuch as a simple orifice involves a negligible investment cost as contrasted with a Venturi scrubber such as is shown, for example, in U.S. Pat. No. 2,604,185. Since a simple orifice plate may be disposed between standard pipe flanges it remains only to provide appropriate injection nozzles.

Moreover a simple orifice scrubber is fully as effective in removing contaminants such as solid particles or dust or other suspended matter from the gas stream as is the more complex Venturi scrubber when the injection of the scrubbing liquid into the high velocity gas stream from the orifice takes place at a velocity which is substantially nil with respect to the velocity of the gas stream or jet.

Actually it has been found that gas containing a substantial portion of finely divided solid particle soot can be consistently reduced to about one to two parts per milllion of soot in the scrubbed gas. It is belived that this striking result follows from the extreme turbulence and changes in directional flow thru which the gas stream goes in the receiving chamber after it has left the orifice.

Thus, in addition to the initial difference in velocity between the droplets of wash liquid and the flow of gas, there are subsequent rapid changes in direction of gas flow as the kinetic energy of the jet stream of gas is expended. This presumably results in a continuing velocity differential between the gas and the finely divided particles of water or other scrubbing liquid which accordingly tend to rapidly shear thru the gas stream and effect a cleansing action.

This effect is realizable at quite modest pressure drops of not more than 15 pounds per square inch and the solid particle material is recoverable as a slurry in the cleaning liquid by simple coalescense of the atomized liquid particles.

The Venturi type of scrubber is selected and designed to effect gradual changes in stream velocity and to avoid excessive losses caused by eddying turbulence. This is accomplished by the complete avoidance of any abrupt or material divergence in the vicinity of the Venturi throat or in the diffusion section so that the fluid flow is essentially streamlined thru the throat. This results in minimizing the pressure drop or loss of pressure in the operation of the device.

The orifice scrubber, on the other hand, due to the abrupt divergence at the orifice, amounting to about 90° or more, obviously tends to induce highly energetic turbulence which, while it undoubtedly shortens the effective length of the jet of high speed gas as compared with the usual deceleration, expansion or diffusion section of a Venturi, nevertheless, because of the sudden energy release in the form of eddying and turbulence, presumably contributes to scrubbing efficiency.

By way of example, reference is made to the attached drawing wherein

Figure 2:
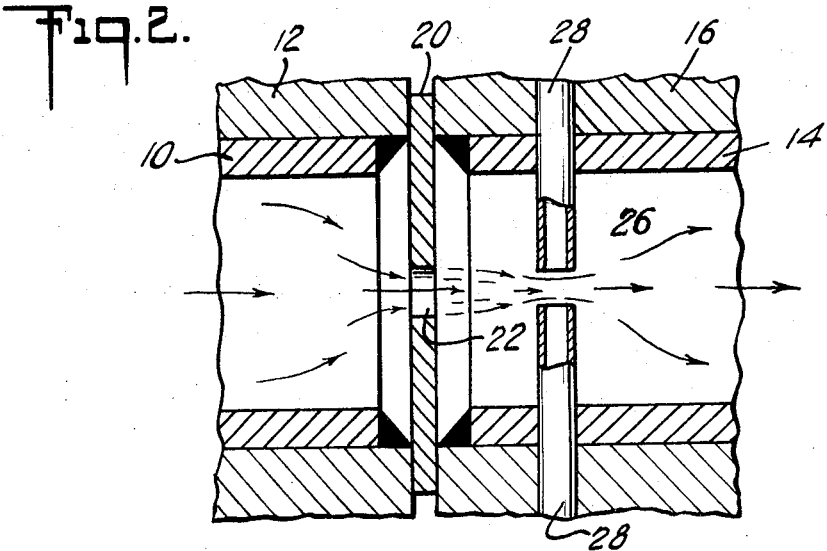

FIG. 1 is an elevation, largely in section, through an orifice scrubber constructed in accordance with the present invention, FIG. 2 is an enlarged detailed view, in vertical section, and illustrating the operation of the scrubber.

As shown in the figures of the drawing, the numeral 10 represents a pipe conducting a flow of gas contaminated with finely divided solid particles, moving in the direction as indicated by the arrow. Pipe 10 terminates in pipe flange 12 which is welded thereto as indicated. The conduit formed thereby connects with continuing downstream pipe 14, provided with a similar pipe flange 16. Between the two aligned pipe flanges, bolted together as at 18 is an orifice plate 20 provided with a central orifice 22. A packing ring is provided as at 24.

The shape and style of the orifice is relatively immaterial insofar as it discharges a high velocity jet stream into a substantially enlarged chamber 26. Thus, instead of the thin-plate orifice shown we may use a sharpedged orifice. Also a rounded or tapered edge orifice, or even a nozzle projection may be employed.

Injection of the scrubbing fluid is readily effected thru oppositely disposed injection nozzles 28. In the present arrangement any number of nozzles can be provided by simply inserting the relatively small diameter injection tubing 28 thru drilled hole in the pipe flange 16 and making suitable external connection to a source of wash liquid as at 30.

As previously indicated, it is important to extend the nozzle extremities inwardly to a point where they at least contact or meet the jet stream from the orifice 22, as indicated more or less diagrammatically or symbolically in FIG. 2 of the drawing. Inasmuch as the vena conteacta of the jet is of typically reduced dimension, this means that the wash liquid nozzles extned inwardly beyond the marginal confines of the orifice projected in an axial direction. It is also important, as indicated, to provide a downstream chamber or conduit of substantially greater transverse dimension than the orifice as, for example, at least, about 1½ times greater than the orifice dimension. Preferably however, in order to effect adequate turbulence, the conduit diameter should be at least twice the orifice diameter and preferably should be considerably in excess of this.

It is also preferred to arrange the liquid injection nozzles so that the incoming liquid has an initial velocity or acceleration which is negligible or substantially zero in the direction of the flow of the gas stream. This therefore initiates contact between the gas and liquid at a practical maximum velocity differential. It means moreover that the liquid is usually injected in a direction radially to the gas stream. This is represented in diagrammatic form by the reference numeral 40 of FIG. 1.

The remainder of the downstream equipment comprises simply a suitable separator or knock-out drum such as is shown, for example in U.S. Pat. No. 2,604,185 where the resulting stream of gas is diffused at a low velocity in the order, say of about 0.5 feet per second or less, in order to permit coalescense of the droplet particles. Product gas accordingly passes off from an outlet near the top of the drum whereas the liquid slurry of of scrubbed particles can be withdrawn from the bottom. Any other suitable means may be used for separating and removing the liquid droplets and collected matter from the gas stream. Obviously the slurry may be filtered or otherwise treated for recovery of the particles and the liquid recycled back to the injection pipes 30.

Another particular advantage of the present invention is the relative ease with which the washing liquid injection nozzles may be radially adjusted to meet the jet stream of gas issuing from the orifice plate.

To this end the nozzles 28 comprise tubular members arranged to slide freely within corresponding radial bores in the flange 16. These are in turn coupled, by fluid-tight coupling means 32 to the wash liquid inlet pipes 30. The extremities of pipes 30 are in turn threaded as at 34 to receive corresponding internal threads on the interior of the annular gland 36. Accordingly therefore the radial position of the tubes or nozzles 28, and the inner extremities thereof may be adjusted radially by simply screwing the inlet tubes inwardly or outwardly of the glands 36.

This obviously enables not only optimum adjustment of the wash liquid injection nozzles but permits appropriate setting for any desirable replacement of the orifice plate. Thus, for example, when the flow rate or other characteristic of the gas stream is to be radically changed, a corresponding change in the orifice plate can be made simply by removing the bolts 18, separating the pipe flanges 12 and 16 and replacing the plate by one more appropriate to the conditions of operation, after which the parts are re-assembled and the injection nozzles adjusted radially.

It has been found that the proper radial positioning of the nozzle may be determined by the fact that scrubbing efficiency markedly increases when the wash liquid is directed into the jet stream of gas.

It is also important to observe that the term "wash liquid" is not limited to water but includes any liquid which has the ability of accepting or absorbing the contaminant material which it is desired to remove from the gas. It will be obvious, for example, that in removing particles of coke or other somewhat oily matter, a hydrocarbon fraction may be the preferred scrubbing liquid.

Obviously the foregoing construction is merely illustrative of the various modifications coming within the scope of the present claims.

We claim:

1. The method of scrubbing a gaseous stream with a washing liquid to remove contaminating particles which comprises passing said gaseous stream thru a restricted plate orifice arranged transversely of said direction of gas flow, at an elevated pressure and a velocity substantially greater than about 100 feet per second into a conduit having a substantially larger transverse dimension than that of said orifice, for creating a relatively high velocity jet of gas of substantially smaller lateral dimension than the lateral dimension of said conduit, injecting downstream of the orifice but not substantially beyond the vena contracta of the jet stream of gas formed by said orifice, a substantial flow of scrubbing liquid, said flow being conducted directly into said jet stream at a point inwardly beyond the confines of the margin of said orifice as projected in an axial direction and being located between the orifice plate and a point not substantially beyond the vena contracta of the jet stream, thereby to disintegrate the washing liquid into fine particles thruout the gas stream and to atomize such liquid therein, conducting said mixture thru a region of turbulence, thereafter subjecting said gaseous stream to relative quiescence sufficient to result in coalescence of the droplets of washing liquid and separating said washing liquid from the residual gas as a stream containing said contaminating particles.

2. Method as defined in claim 1, wherein the scrubbing liquid is injected in a direction substantially radially to the direction of flow of said gas stream to effect maximum differential velocity between the gas and the liquid at the point of injection.

3. The method as defined in claim 1, wherein said jet stream is flowing at a rate substantially in excess of 100 feet per second.

* * * * *